Dec. 8, 1925.

J. V. HJERTBERG 1,564,350

WATER FOUNTAIN

Filed May 6, 1925

Inventor

J. V. Hjertberg

By Lacy & Lacy, Attorneys

Patented Dec. 8, 1925.

1,564,350

UNITED STATES PATENT OFFICE.

JOHN V. HJERTBERG, OF MAIDEN ROCK, WISCONSIN.

WATER FOUNTAIN.

Application filed May 6, 1925. Serial No. 28,455.

*To all whom it may concern:*

Be it known that I, JOHN V. HJERTBERG, a citizen of the United States, residing at Maiden Rock, in the county of Pierce and State of Wisconsin, have invented certain new and useful Improvements in Water Fountains, of which the following is a specification.

This invention relates to an improved water fountain for use in supplying water to poultry and one object of the invention is to provide a fountain in which an improved type of reservoir is removably seated in a pan or trough in spaced relation to the walls of the pan.

Another object of the invention is to provide improved abutment means carried by the bottom of the pan and adapted to engage the lower end portion of the reservoir to retain the reservoir in spaced relation to the walls of the pan.

Another object of the invention is to so construct the reservoir that chickens and other fowls will be prevented from roosting upon the top of the reservoir.

This invention is illustrated in the accompanying drawing, wherein

Figure 1:
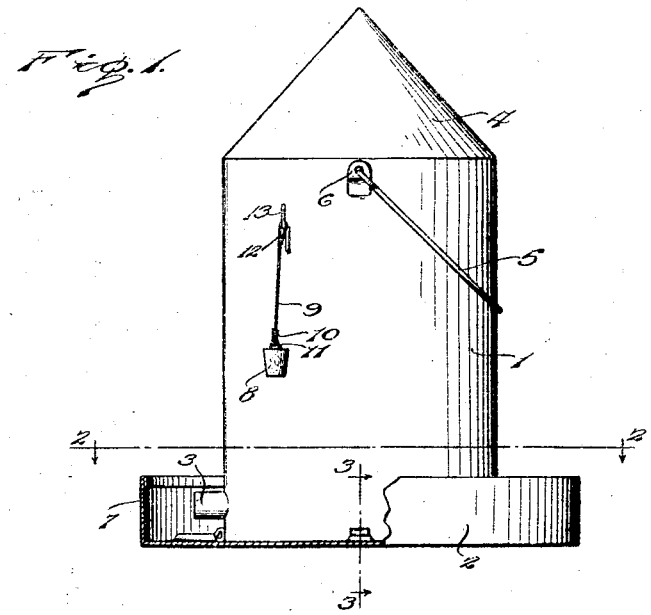
Figure 1 is a view showing the improved fountain principally in side elevation, a portion of the pan being broken away and shown in section.

The water fountain which forms the subject-matter of this invention includes a reservoir 1 and a pan 2 adapted to removably receive the reservoir and provide a trough about the lower end portion of the reservoir into which water will flow through an outlet spout 3 provided near the bottom of the reservoir. The body portion of the reservoir is preferably circular in cross section and at its upper end carries a head 4 which is formed as a cone and, therefore, provides a steep sloping surface upon which a chicken cannot conveniently roost. The head 4 may be rigid with the walls of the reservoir or may be formed separate from the body of the reservoir so that it can be removed when necessary to fill the reservoir. If the head 4 is rigid with the body of the reservoir, the water with which the reservoir is to be filled will be poured into the same through the outlet spout 3. A handle 5 which is carried by ears 6 at opposite sides of the reservoir is provided so that the reservoir may be conveniently lifted and carried from one place to another.

Figure 2:
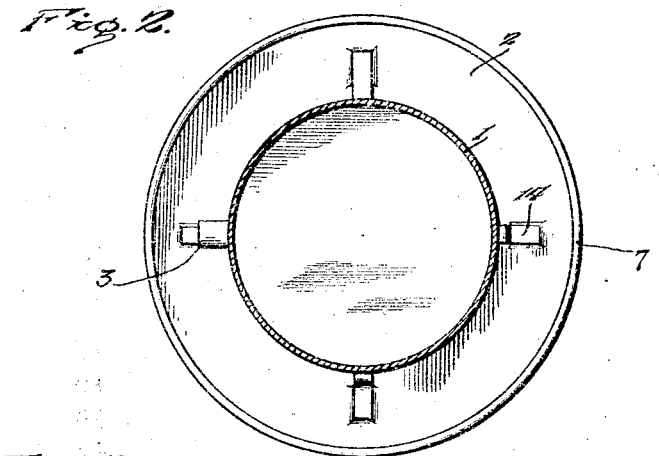
Fig. 2 is a tranverse sectional view taken on the line 2—2 of Fig. 1.
Figure 3:
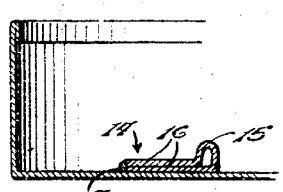
Fig. 3 is a fragmentary sectional view taken on the line 3—3 of Fig. 1.

The pan 2 will also be circular and is provided with an upstanding peripheral wall 7. When the reservoir is placed in the pan, the outlet spout is disposed intermediate the depth of the wall 7 and, therefore, when the stopper 8 is removed from the outer end of the spout water may flow through the spout into the pan until the pan has been filled a sufficient distance to cause a water seal to be provided. In order to prevent the stopper from becoming lost, there has been provided suspending means including a string or wire 9, one end of which is formed into a loop 10 passed through an eye 11 carried by the stopper and the other end of which is formed into a loop 12 adapted to engage a hook 13 carried by the upper portion of the reservoir body. The stopper can, therefore, be hung from the hook 13 where it will not be lost and will be conveniently located when it is desired to close the spout 3 in order to permit the reservoir to be refilled and carried to the pan without the water passing outwardly through the spout. When the reservoir is placed in the pan, it should be retained centrally therein, as shown in Fig. 2, so that the chickens may obtain water from the pan at all points about the reservoir. The means for centering the reservoir in the pan consists of abutments 14, each of which is formed from a strip of sheet metal bent intermediate its length to provide an upstanding head 15 and arms 16. The head 15 is of an inverted U-shape and the arms 16 extend from this head in superposed relation towards the periphery of the pan, as shown in Fig. 3. The abutments rest upon the bottom of the pan and are secured in place by solder 17. While the abutments have been shown secured by solder, it will be understood that any suitable fastening means may be provided which will serve to securely hold them in place and at the same time not cause leaking.

When the fountain is in use, the reservoir is filled with water and the plug 8 is inserted in the outer end of the spout so that the reservoir may be lifted by means of the handle 5 and carried to the pan without the water flowing out through the spout. The reservoir is placed in the pan where it will be properly centered by the abutments 14 and the stopper or plug 8 removed from the spout and suspended from the hook 13. The water will flow through the spout into the pan until the pan has been filled to a sufficient height to form a water seal and prevent further passage of water through the spout. The chickens will drink from the trough forming portion of the pan about the reservoir and as the water is consumed or evaporates and its level is lowered to a point which will break the water seal, a new supply will flow through the spout until the water seal is again formed. The trough will, therefore, be kept filled to the proper level. When necessary, the stopper will be replaced and the reservoir lifted from the pan by means of the handle and carried to a point where it may be refilled and then set back in place.

Having thus described the invention, I claim:

A drinking fountain comprising a pan having a bottom and an upstanding wall, a container removably seated in said pan and resting upon the bottom thereof, abutments carried by the bottom of said pan and adapted to engage the lower end portion of said container to retain the container spaced from the walls of said pan, each abutment being formed from a strip bent intermediate its length to provide an upstanding head to engage said container and superimposed leaves constituting a shank and secured to the bottom of said pan, an outlet spout extending from the lower end portion of said container and disposed intermediate the depth of said pan when the container is seated therein, and a removable closure for said spout.

In testimony whereof I affix my signature.

JOHN V. HJERTBERG. [L. S.]